United States Patent
Hwang et al.

(10) Patent No.: US 7,304,938 B2
(45) Date of Patent: Dec. 4, 2007

(54) INFORMATION STORAGE MEDIUM AND APPARATUS OF RECORDING AND/OR REPRODUCING POINTING INFORMATION

(75) Inventors: Sung-hee Hwang, Seoul (KR); Kyung-geun Lee, Gyeonggi-do (KR); Jung-wan Ko, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 552 days.

(21) Appl. No.: 10/900,427

(22) Filed: Jul. 28, 2004

(65) Prior Publication Data

US 2005/0025005 A1    Feb. 3, 2005

Related U.S. Application Data

(60) Provisional application No. 60/497,920, filed on Aug. 27, 2003.

(30) Foreign Application Priority Data

Jul. 29, 2003    (KR) .................... 10-2003-0052458

(51) Int. Cl.
*G11B 7/00* (2006.01)
(52) U.S. Cl. .................................... 369/275.3

(58) Field of Classification Search ............ 369/275.3, 369/47.1, 47.27, 47.5, 47.51, 53.2, 53.22, 369/44.26
See application file for complete search history.

(56) References Cited

U.S. PATENT DOCUMENTS 7,161,881 B2 *    1/2007 Pereira ................... 369/47.51

FOREIGN PATENT DOCUMENTS

| EP | 1 308 942 A2 | 5/2003 |
|---|---|---|
| JP | 2-171913 | 7/1990 |
| JP | 6-162123 | 6/1994 |

OTHER PUBLICATIONS

Office Action issued in Taiwanese Patent Application No. 93122355 on Oct. 20, 2006.

* cited by examiner

*Primary Examiner*—Nabil Hindi
(74) *Attorney, Agent, or Firm*—Stein, McEwen & Bui, LLP

(57)    ABSTRACT

An information storage medium includes areas of disk-related information having disk-related information to record or reproduce data with respect to the information storage medium, wherein the disk-related information includes common disk-related information and changeable parameter information, and the areas of the disk-related information are arranged according to information about the changeable parameter information.

10 Claims, 13 Drawing Sheets

FIG. 1A (PRIOR ART)

| AREA | | DESCRIPTION | PURPOSE |
|---|---|---|---|
| LEAD-IN AREA | REPRODUCTION -ONLY AREA | PITS OF WOBBLES | DISK-RELATED INFORMATION |
| | RECORDABLE AREA | DMA | DEFECT MANAGEMENT |
| | | BUFFER | DATA INFORMATION |
| | | TEST ZONE | TESTING |
| | | RESERVED AREA | FOR USE LATER |
| | | BUFFER | BUFFER |
| USER DATA AREA | RECORDABLE AREA | | |
| LEAD-OUT AREA | RECORDABLE AREA | | |

FIG. 1B (PRIOR ART)

| AREA | | DESCRIPTION | PURPOSE |
|---|---|---|---|
| LEAD-IN AREA | RECORDABLE AREA | PITS | DISK-RELATED INFORMATION |
| | | RESERVED AREA | |
| USER DATA AREA | | | |
| LEAD-OUT AREA | | | |

FIG. 3A (PRIOR ART)

ZEROTH AREA

| BYES No | CONTENTS | NUMBER OF BYTE |
|---|---|---|
| 0 | DISK TYPE AND VERSION NUMBER(DVD, Ver1.0) | 1 |
| 1 | DISK SIZE(120mm) | 1 |
| 2 | DISK STRUCTURE(SL/DL) : SL | 1 |
| 3 | NUMBER OF STORAGE LAYERS | 1 |
| 4 | RESERVED AREA | 1 |
| 5 | RECORDING SPEED : 1X | 1 |
| 6 | REPRODUCING POWER | 1 |
| 7 | Ttop | 1 |
| 8 | Tmp | 1 |
| 9 | Tcl | 1 |
| 10 | RESERVED AREA | 1 |
| ... | ... | ... |
| m | ... | ... |

FIG. 3B (PRIOR ART)

FIRST AREA

| BYES No | CONTENTS | NUMBER OF BYTE |
|---|---|---|
| 0 | DISK TYPE AND VERSION NUMBER(DVD, Ver1.0) | 1 |
| 1 | DISK SIZE(120mm) | 1 |
| 2 | DISK STRUCTURE(SL/DL) : SL | 1 |
| 3 | NUMBER OF STORAGE LAYERS | 1 |
| 4 | RESERVED AREA | 1 |
| 5 | RECORDING SPEED : 2X | 1 |
| 6 | REPRODUCING POWER | 1 |
| 7 | Ttop | 1 |
| 8 | Tmp | 1 |
| 9 | Tcl | 1 |
| 10 | RESERVED AREA | 1 |
| ... | ... | ... |
| m | ... | ... |

FIG. 3C (PRIOR ART)

SECOND AREA

| BYES No | CONTENTS | NUMBER OF BYTE |
|---|---|---|
| 0 | DISK TYPE AND VERSION NUMBER(DVD, Ver1.0) | 1 |
| 1 | DISK SIZE(120mm) | 1 |
| 2 | DISK STRUCTURE(SL/DL) : DL | 1 |
| 3 | NUMBER OF STORAGE LAYERS:L1 | 1 |
| 4 | RESERVED AREA | 1 |
| 5 | RECORDING SPEED : 1X | 1 |
| 6 | REPRODUCING POWER | 1 |
| 7 | Ttop | 1 |
| 8 | Tmp | 1 |
| 9 | Tcl | 1 |
| 10 | RESERVED AREA | 1 |
| ... | ... | ... |
| m | ... | ... |

FIG. 3D (PRIOR ART)
THIRD AREA

| BYES No | CONTENTS | NUMBER OF BYTE |
|---|---|---|
| 0 | DISK TYPE AND VERSION NUMBER(DVD, Ver1.0) | 1 |
| 1 | DISK SIZE(120mm) | 1 |
| 2 | DISK STRUCTURE(SL/DL) : DL | 1 |
| 3 | NUMBER OF STORAGE LAYERS:L1 | 1 |
| 4 | RESERVED AREA | 1 |
| 5 | RECORDING SPEED : 2X | 1 |
| 6 | REPRODUCING POWER | 1 |
| 7 | Ttop | 1 |
| 8 | Tmp | 1 |
| 9 | Tcl | 1 |
| 10 | RESERVED AREA | 1 |
| ... | ... | ... |
| m | ... | ... |

FIG. 3E (PRIOR ART)

FOURTH AREA

| BYES No | CONTENTS | NUMBER OF BYTE |
|---|---|---|
| 0 | DISK TYPE AND VERSION NUMBER(DVD, Ver1.0) | 1 |
| 1 | DISK SIZE(120mm) | 1 |
| 2 | DISK STRUCTURE(SL/DL) : DL | 1 |
| 3 | NUMBER OF STORAGE LAYERS:L2 | 1 |
| 4 | RESERVED AREA | 1 |
| 5 | RECORDING SPEED : 1X | 1 |
| 6 | REPRODUCING POWER | 1 |
| 7 | Ttop | 1 |
| 8 | Tmp | 1 |
| 9 | Tcl | 1 |
| 10 | RESERVED AREA | 1 |
| ... | ... | ... |
| m | ... | ... |

FIG. 3F (PRIOR ART)

FIFTH AREA

| BYES No | CONTENTS | NUMBER OF BYTE |
|---|---|---|
| 0 | DISK TYPE AND VERSION NUMBER(DVD, Ver1.0) | 1 |
| 1 | DISK SIZE(120mm) | 1 |
| 2 | DISK STRUCTURE(SL/DL) : DL | 1 |
| 3 | NUMBER OF STORAGE LAYERS:L2 | 1 |
| 4 | RESERVED AREA | 1 |
| 5 | RECORDING SPEED : 2X | 1 |
| 6 | REPRODUCING POWER | 1 |
| 7 | Ttop | 1 |
| 8 | Tmp | 1 |
| 9 | Tcl | 1 |
| 10 | RESERVED AREA | 1 |
| ... | ... | ... |
| m | ... | ... |

FIG. 4

| COMMON INFORMATION TABLE | ... |
| --- | --- |
| | TYPE OF STORAGE MEDIUM |
| | NUMBER OF INFORMAITON STORAGE LAYERS |
| | RECORDING SPEED INFORMATION |
| | POINTING FUNCTION |
| | ... |
| PARAMETER TABLE (MULTIPLE SPEEDS, WRITING STRATEGIES, INFORMATION STORAGE LAYERS) ||

FIG. 5
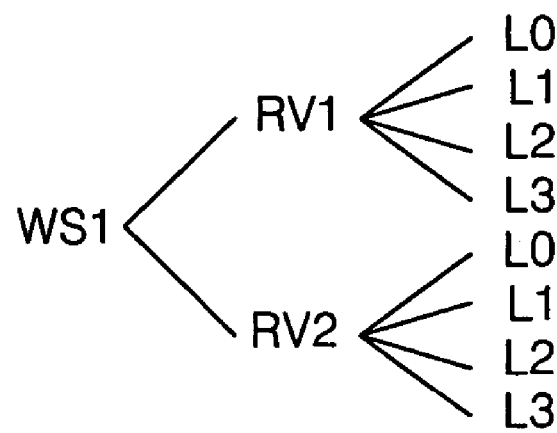
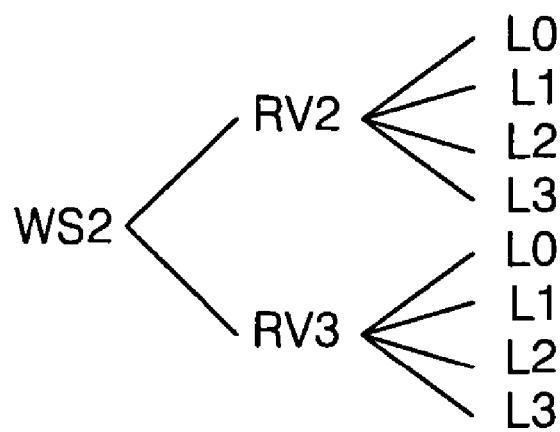
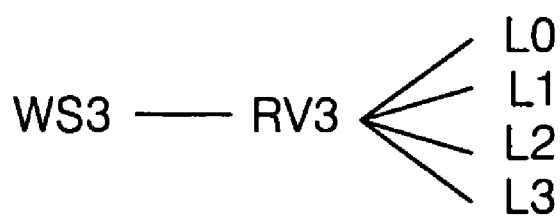
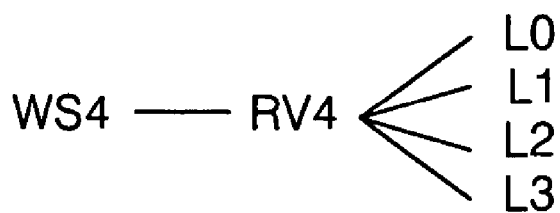

INFORMATION STORAGE MEDIUM AND APPARATUS OF RECORDING AND/OR REPRODUCING POINTING INFORMATION

CROSS-REFERENCE TO RELATED APPLICATIONS

This application claims the benefit of Korean Patent Application No. 2003-52458, filed on Jul. 29, 2003, in the Korean Intellectual Property Office, and U.S. Provisional Application No. 60/497,920, filed on Aug. 27, 2003, in U.S. patent Trademark Office, the disclosures of which are incorporated herein by reference.

FIELD OF THE INVENTION

The present invention relates to an information storage medium comprising medium-related information including changeable information among information related to the information storage medium, and a method and apparatus for recording/reproducing the medium-related information.

DESCRIPTION OF RELATED ART

General optical disks are widely used as information recording media of optical pickup apparatuses for recording/reproducing information in a non-contact way. Optical disks are classified as compact disks (CDs) or digital versatile disks (DVDs) according to their information storage capacity. Examples of recordable optical disks are 650 MB CD-R, CD-RW, 4.7 GB DVD+RW, and the like. Furthermore, HD-DVDs or blu-ray disks (BDs) having a recording capacity of 20 GB or greater are under development.

FIG. 1A shows a data area structure of a conventional recordable information storage medium, and FIG. 1B shows a data area structure of a conventional reproduction-only information storage medium. A general information storage medium includes a lead-in area, a user data area, and a lead-out area. The lead-in area stores disk-related information and the like. The disk-related information may be recorded as pits or wobbles in a recordable information storage medium or recorded as only pits in a reproduction-only information storage medium. The general information storage medium may further include a defect management area (DMA), a buffer zone, an optimal power control (OPC) test zone, a reserved area, and the like.

Examples of the disk-related information include the disk-type, the disk version number, the disk size, the number of information storage layers, information about a writing strategy (e.g., a recording speed, a recording power, or a reproduction power), and the like. As shown in FIG. 2, parameters of a writing strategy are initial pulse time (Ttop), multi-pulse time (Tmp), and cooling pulse time (Tcl), writing power (Pw), erasing power (Pe), and bias power (Pb).

As shown in FIGS. 3A through 3F, a conventional information storage medium stores a change in disk-related information every time the disk-related information is partially changed and without a particular arrangement rule. The disk-related information includes common information, which is common to disks, and changeable information. Examples of the changeable information include the number of information storage layers, information about a recording speed, information about a writing strategy, recording-related information, and the like. As shown in FIGS. 3A through 3F, the changeable information is recorded together with common information in areas of the lead-in area.

When an information storage medium is loaded in a drive, the drive reads out the disk-related information, finds optimal conditions for the drive, and records data to or reproduces data from the information storage medium under the optimal conditions.

The disk-related information may be recorded in various manners according to the standards for the conventional information storage medium. For example, a reproduction-only information storage medium may record the disk-related information in the form of pits, and a recordable information storage medium may record the disk-related information in the form of groove wobbles. Also, during data reproduction, the reproduction-only and recordable information storage media may use a SUM channel and a differential channel, respectively. When data is recorded as groove wobbles, a physical length corresponding to a bit is greater than when data is recorded as pits. Hence, although the same information is read out, it takes longer to read out data recorded as groove wobbles than to read out data recorded as pits. As the amount of information recorded in an information storage medium increases, the time required to read out disk-related information gets longer particularly when the disk-related information is recorded as groove wobbles.

BRIEF SUMMARY

According to an aspect of the present invention, there is provided an information storage medium comprising areas of disk-related information having disk-related information to record or reproduce data with respect to the information storage medium, wherein the disk-related information comprises common disk-related information and changeable parameter information, and the areas of the disk-related information are arranged according to information about the changeable parameter information. The information storage medium may be an optical disk The common disk-related information may comprise at least one of a storage medium type, information about information storage layers, and a recording speed range. The changeable parameter information may comprise at least one of speed information, write strategy information, information storage layer information, version number information, and recording-related information.

The changeable parameter information may comprise recording speed information, information storage layer information and write strategy information, and the areas of the disk-related information may be arranged according to ascending numerical order of the recording speed, ascending numerical order of the information storage layer, and preference of the write strategy.

Each of the areas of disk-related information may be provided with a corresponding recording speed, information storage layer and write strategy information set, and include pointing information which indicates the areas of disk-related information at which the corresponding recording speed, information storage layer and write strategy information sets are stored.

Each of the areas of disk-related information may be provided with a corresponding recording speed, information storage layer and write strategy information set, and the areas of disk-related information may be sequenced according to a specified rule represented by the recording speed, information storage layer and write strategy information sets.

According to another aspect of the present invention, there is provided an information storage medium comprising areas of disk-related information having disk-related information to record or reproduce data with respect to the information storage medium, wherein the disk-related information comprises common disk-related information and changeable parameter information comprising recording speed information, information storage layer information, and writing strategy information, and the areas of the disk-related information are sequenced according to ascending numerical order of the recording speed, within each sequence of areas with the same recording speed, according to ascending numerical order of the information storage layer, and within each sequence of areas with the same recording speed and storage layer, according to preference of the writing strategy.

According to still another aspect of the present invention, there is provided an information storage medium comprising areas of disk-related information having disk-related information to record or reproduce data with respect to the information storage medium, wherein the disk-related information comprises common disk-related information and changeable parameter information comprising recording speed information, information storage layer information, and writing strategy information, and each of the areas of disk-related information is provided with a corresponding recording speed, information storage layer and write strategy information set. The areas of disk-related information may be sequenced according to a specified rule represented by information of the recording speed, information storage layer and write strategy information sets.

According to yet another aspect of the present invention, there is provided an information storage medium comprising a common information table in which common disk-related information is recorded, and a parameter table in which changeable parameter information corresponding to recording and/or reproducing characteristics is recorded, wherein pointing information which indicates the area containing the changeable parameter information is recorded in the common information table. The pointing information may be recorded as a pointing function representing a specified rule in which the changeable parameter information is expressed in ordered pairs.

The arrangement of the ordered pairs may be based on an order from low to high recording speeds, from lower to higher information storage layers, and from corresponding write strategies.

The pointing information may include the order in which pieces of information corresponding to a reference parameter and pieces of information corresponding to a general parameter applied to the reference parameter are recorded in the ascending or descending numerical order of information storage layers, in the ascending or descending numerical order, or characteristic information of the pieces of general parameter information, and in the ascending or descending numerical order, or characteristic information of the pieces of reference parameter information. The reference parameter may be recording speed information, and the general parameter may be write strategy information.

According to an aspect of the present invention, there is provided a method of recording data to an information storage medium, the method comprising recording disk-related information comprising common disk-related information and changeable parameter information in areas of disk-related information, wherein the recording of the changeable parameter information comprises recording the changeable parameter information according to a specified rule to which the areas of disk-related information are arranged.

The changeable parameter information may comprise recording speed information, information storage layer information, and write strategy information, and the areas of disk-related information may be sequenced according to ascending numerical order of the recording speed, within each sequence of areas with the same recording speed, according to ascending numerical order of the information storage layer, and within each sequence of areas with the same recording speed and storage layer, according to preference of the writing strategy.

According to another aspect of the present invention, there is provided a method of recording data to an information storage medium, the method comprising recording disk-related information in areas of disk-related information, wherein the disk-related information comprises common disk-related information and changeable parameter information comprising recording speed information, information storage layer information, and write strategy information, and the recording of the changeable parameter information comprises recording to each of the areas of disk-related information, a corresponding recording speed, information storage layer and write strategy information set.

The method may further comprise recording pointing information to each of the areas of disk-related information which indicates the areas of disk-related information at which the corresponding recording speed, information storage layer and write strategy information sets are recorded. The areas of disk-related information may be sequenced according to a specified rule represented by information of the recording speed, information storage layer and write strategy information sets.

According to still another aspect of the present invention, there is provided a method of recording data to an information storage medium, the method comprising recording common disk-related information in a common information table, recording changeable parameter information corresponding to recording and/or reproducing characteristics in a parameter table, and recording pointing information which indicates the area of the information storage medium containing the changeable parameter information, in the common information table.

The recording of the pointing information may comprise recording the pointing information as a pointing function representing a specified rule in which the changeable parameter information is expressed in ordered pairs.

The pointing information may include the order in which pieces of information corresponding to a reference parameter and pieces of information corresponding to a general parameter applied to the reference parameter are recorded in the ascending or descending numerical order of information storage layers, in the ascending or descending numerical order, or characteristic information of the pieces of general parameter information, and in the ascending or descending numerical order, or characteristic information of the pieces of reference parameter information.

According to an aspect of the present invention, there is provided a method of recording or reproducing data from an information storage medium, the method comprising reading out disk-related information comprising common disk-related information and changeable parameter information from areas of disk-related information which are arranged according to information about the changeable parameter information, and recording the data according to the disk-related information or reproducing the data in consideration of the common disk-related information.

The changeable parameter information may comprise recording speed information, information storage layer information, and write strategy information, and the areas of disk-related information may be sequenced according to ascending numerical order of the recording speed, within each sequence of areas with the same recording speed, according to ascending numerical order of the information storage layer, and within each sequence of areas with the same recording speed and storage layer, according to preference of the writing strategy.

According to an aspect of the present invention, there is provided a method of accessing data from an information storage medium, the method comprising reading out pointing information represented by a pointing function, the pointing information indicating an area of a parameter table containing changeable parameter information corresponding to recording and/or reproducing characteristics, the pointing information being a specified rule represented by the pointing function and being in a common information table containing common disk-related information.

According to an aspect of the present invention, there is provided a method of shortening recording/reproducing time to/from an information storage medium, the method comprising recording as a pointing function, pointing information indicating areas of the information storage medium at which changeable disk-related information sets are stored, the pointing function representing a specified rule, and accessing a desired one of the changeable disk-related information sets by referring only to the specified rule of the pointing function.

According to another aspect of the present invention, there is provided a method of shortening recording/reproducing time to/from an information storage medium, the method comprising accessing a changeable disk-related information set by referring only to a specified rule of a pointing function, the pointing function referring to pointing information indicating areas of the information storage medium storing changeable disk-related information sets. The changeable disk-related information set may comprise speed information, information storage layer information, and write strategy information.

According to an aspect of the present invention, there is provided an apparatus for recording data on an information storage medium, comprising a writer for writing data to the information storage medium, and a controller which controls the writer to write changeable parameter information of disk-related information in areas of disk-related information according to a specified rule to which the areas of disk-related information are arranged.

The changeable parameter information may comprise recording speed information, information storage layer information, and write strategy information, and the areas of disk-related information may be sequenced according to ascending numerical order of the recording speed, within each sequence of areas with the same recording speed, according to ascending numerical order of the information storage layer, and within each sequence of areas with the same recording speed and storage layer, according to preference of the writing strategy.

The changeable parameter information may comprise recording speed information, information storage layer information, and write strategy information, and the controller may control the writer to write to each of the areas of disk-related information, a corresponding recording speed, information storage layer and write strategy information set.

According to another aspect of the present invention, there is provided an apparatus for recording data on an information storage medium, comprising a writer for writing data to the information storage medium, and a controller which controls the writer to write pointing information as a pointing function representing a specified rule, the pointing information indicating an area of the information storage medium containing changeable parameter information corresponding to recording and/or reproducing characteristics.

According to an aspect of the present invention, there is provided an apparatus for reproducing data from an information storage medium, comprising a reader for reading data from the information storage medium, and a controller which controls the reader to read changeable parameter information of disk-related information from areas of disk-related information, the changeable parameter information being stored in the areas of disk-related information according to a specified rule to which the areas of disk-related information are arranged.

According to another aspect of the present invention, there is provided an apparatus for reproducing data from an information storage medium, comprising a reader for reading data from the information storage medium, and a controller which controls the reader to read pointing information having a pointing function that represents a specified rule, the pointing information indicating an area of the information storage medium containing changeable parameter information corresponding to recording and/or reproducing characteristics.

According to an aspect of the present invention, there is provided a disk drive for writing and/or reading with respect to an information storage medium, comprising a writing and/or reading section, and a control section which controls the writing and/or reading section, wherein the writing and/or reading section comprises a writer and/or reader which writes changeable parameter information of disk-related information in areas of disk-related information according to a specified rule to which the areas of disk-related information are arranged, and reads the changeable parameter information from the information storage medium.

According to another aspect of the present invention, there is provided a disk drive for writing and/or reading with respect to an information storage medium, comprising a writing and/or reading section, and a control section which controls the writing and/or reading section, wherein the writing and/or reading section comprises a writer and/or reader which writes pointing information as a pointing function representing a specified rule, the pointing information indicating an area of the information storage medium containing changeable parameter information corresponding to recording and/or reproducing characteristics, reads the pointing information from the information storage medium, and reads the changeable parameter information.

The control section may comprise an interface to receive a recording commend, a digital signal processor (DSP) which performs ECC encoding on to-be-recorded data, a radio frequency amplifier which converts data received from the DSP into an RF signal, a servo which servo-controls the reading and/or writing section, and a system controller which performs initialization for recording.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which:

FIG. 1A is a layout of a conventional recordable information storage medium;

FIG. 1B is a layout of a conventional reproduction-only information storage medium;

FIGS. 3A through 3F are examples of a layout of a conventional information storage medium in which disk-related information is recoded;

FIG. 4 shows a layout of an information storage medium according to an embodiment of the present invention in which disk-related information is recorded;

FIG. 5 is a family tree of ordered pairs of disk-related parameters that are recorded according to a pointing function, which is recorded in an information storage medium according to an embodiment of the present invention;

DETAILED DESCRIPTION OF EMBODIMENTS

Figure 2:
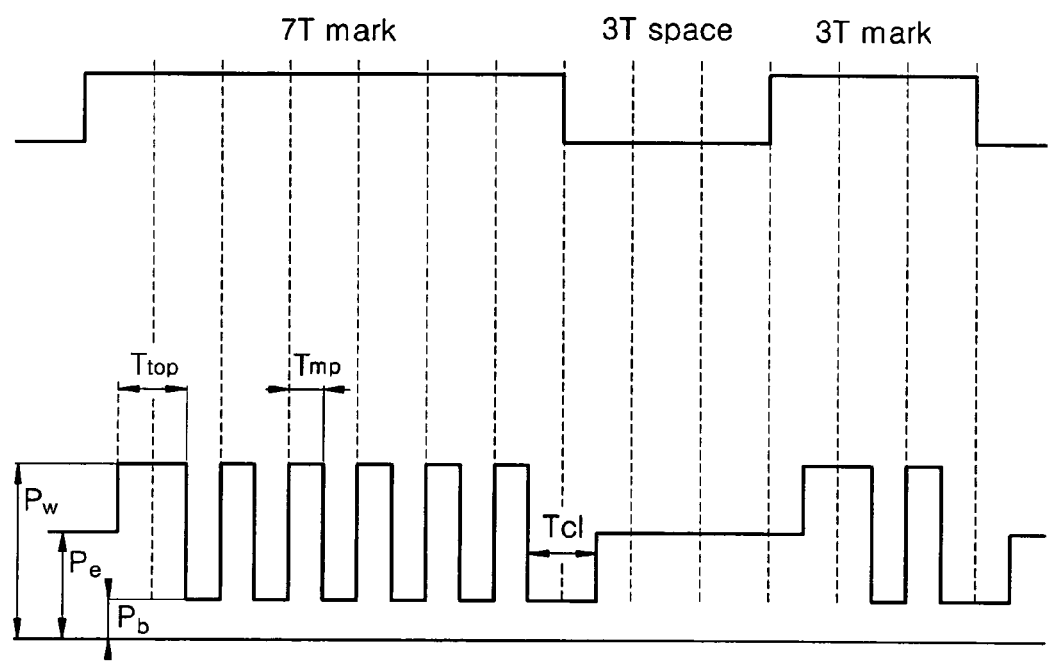
FIG. 2 shows general recording-related parameters in a writing pulse pattern.

Reference will now be made in detail to embodiments of the present invention, examples of which are illustrated in the accompanying drawings, wherein like reference numerals refer to the like elements throughout. The embodiments are described below in order to explain the present invention by referring to the figures.

Referring to FIG. 4, an information storage medium according to an embodiment of the present invention stores common disk-related information in a common information table and changeable disk-related information, also referred to as changeable parameter information, in a parameter table next to the common information table, so as to effectively read out disk-related information where the information storage medium is loaded in a drive. According to an aspect of the present invention, the common information table stores a pointing function that represents pointing information which indicates the area that stores the changeable parameter information. The changeable parameter information may be updated due to an increase in the number of information storage layers and diversifications of a recording speed and a writing strategy (WS).

Examples of the common disk-related information include the storage medium type (e.g., a reproduction-only storage medium, a write-once storage medium, and a rewritable storage medium), information about information storage layers, and a recording speed range. The recording speed range may be represented using maximum and minimum recording speeds. The number of recording speeds may also be recorded in the common information table.

Examples of the changeable parameter information include information about a recording speed, the number of information storage layers, and information about a writing strategy. Such changeable parameter information may be different for disks and updated with a future increase in the number of information storage layers and future diversifications of the recording speed and the WS.

For example, this changeable parameter information is recorded in a specified area of a disk-related information area. According to an aspect, the pointing information, which indicates the area that contains the changeable parameter information, is recorded as a pointing function which represents a specified rule according to the present invention. The pointing function may include a plurality of parameters and vary according to a reference parameter among the parameters.

To be more specific, the parameters included in the pointing function may refer to information about a recording speed, information about a recording strategy, information about the number of information storage layers, and the like.

A first example in which information about a recording speed is determined as a reference parameter for a pointing function will now be described. If a useable recording speed ranges from 1× to 8× speeds, the pointing function depends on the number of and the order of recording speeds.

If the information about a recording speed is a reference parameter for a pointing function and includes first through n-th recording speeds, the pointing function may include the following components as shown in Table 1.

TABLE 1

| First recording speed | Writing strategy(s) applicable to first recording speed |
| Second recording speed | Writing strategy(s) applicable to second recording speed |
| ... | ... |
| (n-1)th recording speed | Writing strategy(s) applicable to (n-1)th recording speed |
| n-th recording speed | Writing strategy(s) applicable to n-th recording speed |

The first recording speed and each of the recording writing strategy or strategies applied to the first recording speed are arranged according to a specified rule, and the second recording speed and each of the recording writing strategy(s) applied to the second recording speed are arranged according to the specified rule. Likewise, the n-th (where n denotes a natural number) recording speed and each of the writing strategy(s) applied to the n-th recording speed are arranged according to the specified rule. These recording speeds and writing strategies may be recorded in each information storage layer.

To be more specific, if the information storage medium stores four usable recording speeds and four useable writing strategies, a pointing function may be recorded as four bytes. The number of bytes for a pointing function may vary according to the number of pieces of information corresponding to a reference parameter. In other words, when a recording speed is a reference parameter for a pointing function and information about the recording speed includes four recording speeds, four bytes of changeable disk-related information as shown in Table 2 can be construed with respect to the pointing function.

TABLE 2

| Byte No. | Recording speed information Seventh to fourth bits | Writing strategy information Third to zeroth bits |
| --- | --- | --- |
| 0 | 0001 | 0011 |
| 1 | 0010 | 0011 |
| 2 | 0100 | 0100 |
| 3 | 1000 | 1000 |

As shown in Table 2, if the pointing function prescribes that a first recording speed is recorded in a fourth bit of each byte, a second recording speed is recorded in a fifth bit thereof, a third recording speed is recorded in a sixth bit thereof, and a fourth recording speed is recorded in a seventh bit thereof, a drive can recognize that the first recording speed has been recorded in a first byte, the second recording speed has been recorded in a second byte, the third recording speed has been recorded in a third byte, and the fourth recording speed has been recorded in a fourth byte. If the pointing function prescribes that a first writing strategy WS1 is recorded in a zeroth bit of each byte, a second writing strategy WS2 is recorded in a first bit thereof, a third writing strategy WS3 is recorded in a second bit thereof, and a fourth writing strategy WS4 is recorded in a third bit thereof, the drive can recognize that the WS1 and WS2 can be applied to each of the first and second recording speeds, the WS3 can be applied to the third recording speed, and the WS4 can be applied to the fourth recording speed.

Recording speed information may be recorded in many ways. For example, recording speed information may be expressed as any combination of a plurality of bits. To be more specific, if recording speed information is recorded as a combination of four bits, it may be recorded as 16 bit combinations. That is, 0001b represents a 1× speed, 0010b represents a 2× speed, 0011b represents a 3× speed, 0100 represents a 4× speed, and 0101 represents a 5× speed. As another example, each piece of recording speed information may be recorded in each bit. If first through fourth recording speeds are recorded in four bits, the first recording speed is recorded in the first bit, the second recording speed is recorded in the second bit, the third recording speed is recorded in the third bit, and the fourth recording speed is recorded in the fourth bit.

According to the pointing function corresponding to Table 2, first and second writing strategies are applicable to the first recording speed and also to the second recording speed. A third writing strategy is applicable to the third recording speed, and a fourth writing strategy is applicable to the fourth recording speed. The pointing function represents a rule about the order or arrangement way in which these recording speeds and writing strategies are recorded.

According to an aspect of the present invention, because the recording speed information and the recording strategy information are recorded in each information storage layer, they may be recorded in ascending or descending order of the information storage layers.

If the recording speed information includes a 1× speed, a 2× speed, a 4× speed, and a 8× speed, and the writing strategy information includes first through fourth writing strategies WS1, WS2, WS3, and WS4, a corresponding pointing function creates four cases of disk-related information because the number of useable recording speeds is 4. In other words, 4 bytes are used to represent the four recording speeds that serve as a reference parameter for a pointing function.

In view of writing strategies, a pointing function may be defined in various ways. For example, disk-related information may be recorded in four bytes. Each of the useable recording speeds may be recorded in the seventh through fourth bits of each byte, and a writing strategy(s) applicable to the corresponding recording speed may be recorded in the third through zeroth bits.

If the recording speeds recorded in the common information table are 1×, 2×, 4×, and 8× speeds, and the corresponding information storage medium includes four information storage layers L0, L1, L2, and L3, pieces of pointing information represented by a pointing function may be expressed in ordered pairs, for example, (recording speed, writing strategy, information storage layer), such as: (1× speed, WS1, L0)→(1× speed, WS1, L1)→(1× speed, WS1, L2)→(1× speed, WS1, L3)→(1× speed, WS2, L0)→(1× speed, WS2, L1)→(1× speed, WS2, L2)→(1× speed, WS2, L3)→(2× speed, WS1, L0)→(2× speed, WS1, L1)→(2× speed, WS1, L2)→(2× speed, WS1, L3)→(2× speed, WS2, L0)→(2× speed, WS2, L1)→(2× speed, WS2, L2)→(2× speed, WS2, L3)→(4× speed, WS3, L0)→(4× speed, WS3, L1)→(4× speed, WS3, L2)→(4× speed, WS3, L3)→(8× speed, WS4, L0)→(8× speed, WS4, L1)→(8× speed, WS4, L2)→(8× speed, WS4, L3).

The above arrangement order of ordered pairs represents a pointing information arrangement rule in which each recording speed and a writing strategy or strategies applicable to the corresponding recording speed are arranged in the ascending numerical order of information storage layers (i.e., L0→L1→L2→L3). To be more specific, first, the 1× speed and the first writing strategy WS1 applicable to the 1× speed make a pair with each of the information storage layers L0, L1, L2, and L3 in the ascending numerical order of the information storage layers, the 1× speed and the second writing strategy WS2 applicable to the 1× speed make a pair with each of the information storage layers L0, L1, L2, and L3 in the ascending numerical order of the information storage layers. Next, the 2× speed and each of the first and second writing strategies WS1 and WS2 applicable to the 2× speed make a pair with each of the information storage layers L0, L1, L2, and L3 in the ascending numerical order of the information storage layers. This arrangement rule is equally applied to the 4× and 8× speeds and the third and fourth writing strategies WS3 and WS4. Hence, a drive can recognize the location where desired information exists, from this arrangement rule.

the above-described arrangement rule of pointing information is but one non-limiting example. Even when changeable disk-related information is changed, the corresponding pointing function may also represent pointing information corresponding to the changed information.

A second example in which the recording speed is adopted as the reference parameter for the pointing function will now be described. In this case, disk-related information based on the pointing function is as shown in Table 3.

TABLE 3

| Byte No. | Recording speed information Seventh to fourth bits | Recording strategy information Third to zeroth bits |
| --- | --- | --- |
| 0 | 0001 | 0001 |
| 1 | 0010 | 0001 |
| 2 | 0100 | 0010 |
| 3 | 1000 | 0100 |

In Table 3, the first writing strategy W1S is recorded in the bytes where first and second recording speeds are recorded, the second writing strategy WS2 is recorded in the byte where a third recording speed is recorded, and the third writing strategy WS3 is recorded in the byte where a fourth recording speed is recorded. The pointing function represents pointing information about the locations of the recording speeds and writing strategies.

The disk-related information may be recorded in many ways according to the present invention. For example, a reference parameter and a general parameter applicable to the reference parameter may be recorded in each of the information storage layers in the ascending or descending numerical order of the information storage layers, in the ascending or descending numerical order of, or according to characteristic(s) of the reference parameter, and in the ascending or descending numerical order of, or according to characteristic(s) of the general parameter. When the reference parameter is information about a recording speed, each of useable recording speeds may be numbered, and the reference parameter and a general parameter applicable to the reference parameter may be recorded in each of the information storage layers in the ascending or descending numerical order of the recording speeds To be more specific, when the recording speeds recorded are 1×, 2×, 4×, and 6× speeds, and the corresponding information storage medium includes four information storage layers L0, L1, L2 and L3 pointing information represented by the pointing function corresponding to Table 3 can be expressed in as following exemplary ordered pairs (recording speed, writing strategy, information storage layer), such as: (1× speed, WS1, L0)→(1× speed, WS1, L1)→(1× speed, WS1, L2)→(1× speed, WS1, L3)→(2× speed, WS1, L0)→(2× speed, WS1, L1)→(2× speed, WS1, L2)→(2× speed, WS1, L3)→(3× speed, WS2, L0)→(3× speed, WS2, L1)→(3× speed, WS2, L2)→(3× speed, WS2, L3)→(6× speed, WS3, L0)→(6× speed, WS3, L1)→(6× speed, WS3, L2)→(6× speed, WS3, L3). The above arrangement of the above ordered pairs is based on a rule in which each of the recording speeds and a writing strategy or strategies applicable to the corresponding recording speed make a pair with each of the information storage layers L0, L1, L2 and L3 in the ascending numerical order of the information storage layers (i.e., L0→L1→L2→L3).

The pointing function according to the above exemplary embodiment represents the order/locations in which pieces of parameter information about information storage layers, multiple speeds, and writing strategies are recorded on an information storage medium according to the present invention. In other words, the pointing function may include a rule in which the pieces of parameter information are expressed in ordered pairs. From this rule, the location where desired information exists may be determined. In the above example, the arrangement of ordered pairs is based on a rule in which pieces of parameter information are arranged in the order of from lower to higher information storage layers, from first to fourth writing strategies WS1 to WS4, and from low to high multiple speeds. The pointing function aspect may represent an information arrangement rule that may be applied to other information storage media, so that an information storage medium adopting the pointing function according to the present embodiment is compatible with and extensible to other information storage media products.

If writing strategy information is adopted as a reference parameter for the pointing function and includes several writing strategies that are supported by the corresponding information storage medium, each of the writing strategies matches with a recording speed(s) applicable to the corresponding writing strategy. In this case, a pointing function can be represented as in Table 4.

TABLE 4

| First writing strategy WS1 | Recording speed(s) applicable to WS1 |
|---|---|
| Second writing strategy WS2 | Recording speed(s) applicable to WS2 |
| ... | ... |
| (m-1)th writing strategy WS(m-1) | Recording speed(s) applicable to WS(m-1) |
| m-th writing strategy WSm | Recording speed(s) applicable to WSm |

According to Table 4, the pointing function may determine a rule in which, when writing strategy information is a reference parameter, each of the writing strategies and a recording speed(s) applicable to the corresponding writing strategy are recorded in the order of information storage layers. For example, when an information storage medium includes first through fourth writing strategies WS1, WS2, WS3, and WS4, first and second recording speeds RV1 and RV2 are applied to the first writing strategy WS1, second and third recording speeds RV2 and RV3 are applied to the second writing strategy WS2, the third recording speed RV3 is applied to the third writing strategy WS3, and a fourth recording speed RV4 is applied to the fourth writing strategy WS4. In this case, ordered pairs in which each of the writing strategies and each of the recording speeds applied to the corresponding writing strategy make a pair with each of the information storage layers in the order of the information storage layers are illustrated in a family tree of FIG. 5. The information storage layers are information storage layers L0, L1, L2 and L3.

Referring to FIG. 5, the writing strategy information is a reference parameter for the pointing function according to the present invention, and pointing information based on the pointing function may be expressed in the following exemplary ordered pairs (writing strategy, recording speed, information storage layer): (WS1, RV1, L0)→(WS1, RV1, L1)→(WS1, RV1, L2)→(WS1, RV1, L3)→(WS1, RV2, L0)→(WS1, RV2, L1)→(WS1, RV2, L2)→(WS1, RV2, L3)→(WS2, RV2, L0)→(WS2, RV2, L1)→(WS2, RV2, L2)→(WS2, RV2, L3)→(WS2, RV3, L0)→(WS2, RV3, L1)→(WS2, RV3, L2)→(WS2, RV3, L3)→(WS3, RV3, L0)→(WS3, RV3, L1)→(WS3, RV3, L2)→(WS3, RV3, L3)→(WS4, RV4, L0)→(WS4, RV4, L1)→(WS4, RV4, L2)→(WS4, RV4, L3).

Given 8 information storage layers, 4 recording speeds, and 2 writing strategies, 64 (8×4×2) ordered pairs may be obtained. When all of the 64 ordered pairs are recorded, a conventional information storage medium requires 64 pointers to individually point the 64 ordered pairs. However, the information storage medium according to an embodiment of the present invention may represent the parameter information as a specified rule represented by a pointing function, so that the large amount of pointing information can be effectively recorded in only a small number of bytes.

As described above, the disk-related information may be recorded in many ways. In particular, according to an aspect of the present invention, changeable parameter information may be provided to indicate a specified rule to result in units of disk-related information having a corresponding sequence in the information storage medium. The areas of disk-related information may be arranged according to information about the changeable parameter information.

For example, areas of disk-related information may be arranged according to information about a reference parameter, for example, ascending or descending numerical order of, or characteristic(s) of the reference parameter, information about an information storage layer, for example, ascending or descending numerical order of the information storage layers, and information about a general parameter applicable to the reference the reference parameter, for example, ascending or descending numerical order of, or characteristic(s) of the general parameter.

Accordingly, an information storage medium according to another embodiment of the present invention comprises areas of disk-related information which are arranged according to information about a reference parameter, an information storage layer, and a general parameter. To be more specific, and for example, where the reference parameter is information about a recording speed, plurality of recording speeds being applicable, the information storage medium comprises a plurality of recording layers, and various write strategies are applicable, a specified rule may be expressed as: (recording speed, information storage layer, writing strategy preference (WSp)). That is, the areas of disk-related information is sequenced according to ascending numerical order of the recording speed, according to ascending numerical order of the information storage layer, and according to the preference of the writing strategy.

According to an aspect of the present invention, areas of disk-related information is sequenced according to ascending numerical order of the recording speed (1×, 2×, 3×, etc.,), then within each sequence of areas with the same recording speed, according to ascending numerical order of the information storage layer (L0, L1, L2 etc.,), and then within each sequence of areas with the same recording speed and storage layer, according to the preference of the writing strategy. For example, where an information storage medium includes four information storage layers L0, L1, L2 and L3 (1× speed, L0, WSp1) is provided in $0^{th}$ area, (1× speed, L0, WSp2) is provided in $1^{st}$ area, (1× speed, L1, WSp1) is provided in $2^{nd}$ area, (1× speed, L1, WSp2) is provided in $3^{rd}$ area, (1× speed, L2 WSp1) is provided in $4^{th}$ area, (1× speed, L2 WSp2) is provided in $5^{th}$ area, (1× speed, L3 WSp1) is provided in $6^{th}$ area,(1× speed, L3 WSp2) is provided in $7^{th}$ area, (2× speed, L0, WSp3) is provided in $8^{th}$ area, etc., According to another aspect of the present invention, pointing information which indicates the location of the changeable parameter information with respect to the areas of disk-related information may be provided in each area of disk-related information. For example, where each area of disk-related information comprises common disk-related information and applicable changeable parameter information, for example, a corresponding recording speed, information storage layer and write strategy information set, pointing information which indicates the location of the recording speed, information storage layer and write strategy information sets is provided in each of the areas of disk-related information.

According to still another aspect of the present invention, common disk-related information and changeable parameter information may be arranged using one or more tables.

Figure 6:
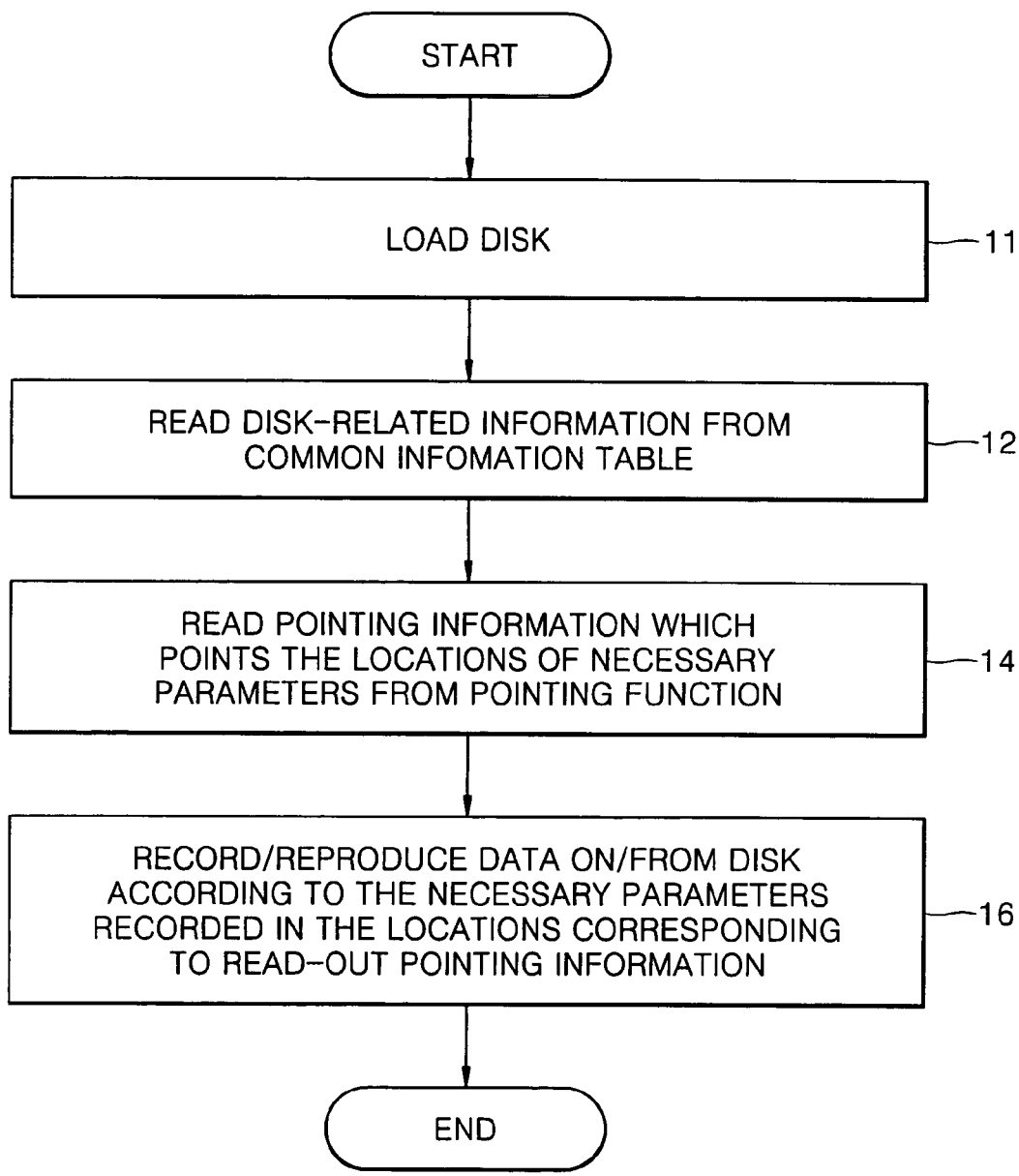
FIG. 6 is a flowchart for illustrating a method of recording pointing information to and/or reproducing the same from an information storage medium according to an embodiment of the present invention.

FIG. 6 is a flowchart illustrating a method of recording pointing information to and/or reproducing the same from an information storage medium according to the FIG. 4 embodiment. In an information storage medium according to am embodiment of the present invention, information that is common to all kinds of disks is recorded in a common information table of a specified area, for example, a disk-related information area, and parameter information (i.e., information having different recording characteristics for disks or changeable information) is recorded in a parameter information table of the specified area. A pointing function representing pointing information which indicates the area that contains the parameter is recorded in the common information table. The pointing information included in the pointing function is represented as a specified rule so that the location of needed information can be rapidly accessed.

Referring to FIG. 6, first, an information storage medium according to the present embodiment, for example, a disk, is loaded in a disk drive in operation 11. Thereafter, disk-related information is read from the common information table in operation 12. Next, pointing information that points the locations where needed parameters are recorded is read from the pointing function in operation 14. Then, in operation 16, data is recorded to or reproduced from the disk, according to the needed parameters recorded in the locations corresponding to the read-out pointing information.

According to another method of the present invention, where an information storage medium comprises areas of disk-related information which are arranged according to changeable parameter information of disk-related information, the disk-related information is read and data is recorded according to the read disk-related information or reproduced in consideration of common disk-related information of the disk-related information medium.

Figure 7:
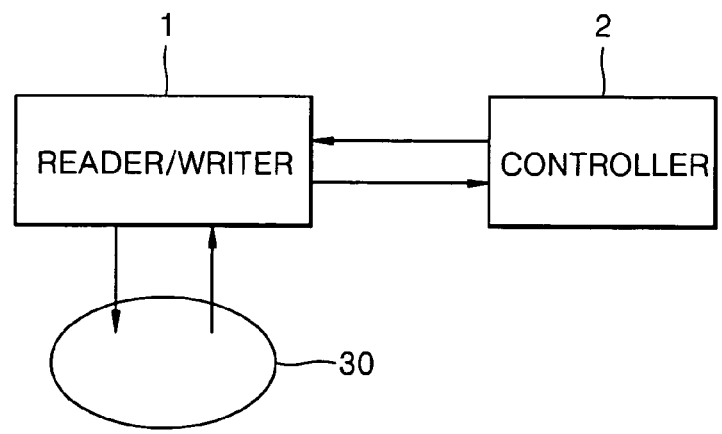
FIG. 7 is a block diagram of an apparatus for recording/reproducing pointing information to/from an information storage medium according to an embodiment of the present invention.

FIG. 7 is a block diagram of an apparatus for recording/reproducing pointing information to/from an information storage medium according to an embodiment of the present invention. The apparatus includes a writer/reader 1 and a controller 2. The writer/reader 1 writes data to and/or reads data from a disk 30, which is the information storage medium according to an embodiment of the present invention. The controller 2 controls the writer/reader 1 so that pointing information indicating locations where disk-related information has been recorded can be written to or read from the disk 30. Parameter information is reproduced from the read-out pointing information, and data is recorded on or reproduced from the disk 30 according to the reproduced parameter information.

Figure 8:
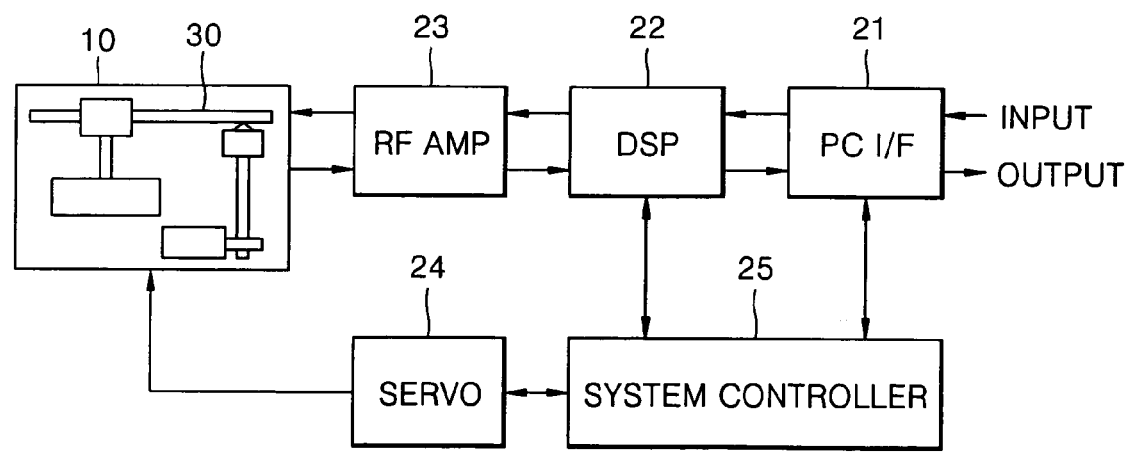
FIG. 8 is a block diagram of a disk drive in which the apparatus of FIG. 7 is implemented.

FIG. 8 is a block diagram of a disk drive in which the apparatus of FIG. 7 is implemented. Referring to FIG. 8, the disk drive includes a pickup 10 to serve as the writer/reader 1. The disk 30 is loaded in the pickup 10. The disk drive further includes a PC I/F 21, a DSP 22, an RF AMP 23, a servo 24, and a system controller 25, all of which constitute the controller 2.

Upon recording, the PC I/F 21 receives a recording command together with data to be recorded, from a host (not shown). The system controller 25 performs initialization for recording. More specifically, the system controller 25 reads out information for initialization, such as, disk-related information stored in a lead-in area of a disk, and prepares for recording based on the read-out information. The DSP 22 performs ECC encoding on the to-be-recorded data received from the PC I/F 21 by adding data such as parity to the received data, and then modulates the ECC-encoded data in a specified manner. The RF AMP 23 converts the data received from the DSP 22 into an RF signal. The pickup 10 records the RF signal received from the RF AMP 23 to the disk 30. The servo 24 receives a command for servo control from the system controller 25 and servo-controls the pickup 10. If the disk 30 stores no reproducing speed information, the system controller 25 commands the pickup 10 to write the reproducing speed information to a specified area of the disk 30 when recording starts, while recording is being executed, or after recording has been completed.

Upon reproduction, the PC I/F 21 receives a reproduction command from the host (not shown). The system controller 25 performs initialization for reproduction. When the initialization is completed, the system controller 25 reads out reproducing speed information recorded on the disk 30 and performs reproduction at a reproducing speed corresponding to the read-out reproducing speed information. The pickup 10 projects a laser beam onto the disk 30, receives a laser beam reflected by the disk 30, and outputs an optical signal. The RF AMP 23 converts the optical signal received from the pickup 10 into an RF signal, supplies modulated data obtained from the RF signal to the DSP 22, and supplies a servo control signal obtained from the RF signal to the servo 24. The DSP 22 demodulates the modulated data and outputs data obtained through ECC error correction. The servo 24 receives the servo control signal from the RF AMP 23 and a command for servo control from the system controller 25 and servo-controls the pickup 10. The PC I/F 21 sends data received from the DSP 22 to the host (not shown).

As described above, changeable parameter information of disk-related information may be arranged according to a specified rule to result in areas of disk-related information having a corresponding sequence in the information storage medium. According to one embodiment, areas of disk-related information may be sequenced according to information about the recording speed, information storage layer, and preference of the writing strategy.

According to another embodiment, an information storage medium may store a pointing function that represents a specified rule about pointing information recorded in a common information table of a disk-related information area. That is, pieces of pointing information that indicate areas that store changeable disk-related information are recorded as a pointing function which represents a specified recording rule of the pieces of pointing information, so that pointing information corresponding to change in the disk-related information can be effectively recorded, and necessary disk-related information can be more efficiently accessed by referring to the specified rule of the pointing function. The pointing function aspect may be applied to other information storage media to facilitate compatibility and extensibility.

Although a few embodiments of the present invention have been shown and described, the present invention is not limited to the described embodiments. Instead, it would be appreciated by those skilled in the art that changes may be made in these embodiments without departing from the principles and spirit of the invention, the scope of which is defined by the claims and their equivalents.

What is claimed is:

1. An information storage medium comprising areas of disk-related information having disk-related information to record or reproduce data with respect to the information storage medium, wherein
the disk-related information comprises common disk-related information and changeable parameter information, and the areas of the disk-related information are ordered according to the changeable parameter information, and
the changeable parameter information comprises recording speed information, information storage layer information, and write strategy information.

2. The information storage medium according to claim 1, wherein the common disk-related information comprises at least one of a storage medium type, other information about information storage layers, and a recording speed range.

3. The information storage medium according to claim 1, wherein the changeable parameter information further comprises at least one of other speed information, version number information, and recording-related information.

4. The information storage medium according to claim 1, wherein the areas of the disk-related information are ordered according to ascending numerical order of the recording speed, ascending numerical order of the information storage layer, and preference of the write strategy.

5. The information storage medium according to claim 1, wherein each of the areas of disk-related information is provided with a corresponding recording speed, information storage layer, and write strategy information set, and includes pointing information which indicates the areas of disk-related information at which the corresponding recording speed, information storage layer, and write strategy information sets are stored.

6. The information storage medium according to claim 1, wherein each of the areas of disk-related information is provided with a corresponding recording speed, information storage layer and write strategy information set, and the areas of disk-related information are sequenced according to a specified rule represented by the recording speed, information storage layer, and write strategy information sets.

7. An information storage medium comprising areas of disk-related information having disk-related information to record or reproduce data with respect to the information storage medium, wherein:
the disk-related information comprises common disk-related information and changeable parameter information comprising recording speed information, information storage layer information, and writing strategy information, and
the areas of the disk-related information are sequenced according to ascending numerical order of the recording speed, within each sequence of areas with the same recording speed, according to ascending numerical order of the information storage layer, and within each sequence of areas with the same recording speed and storage layer, according to preference of the writing strategy.

8. An information storage medium comprising areas of disk-related information having disk-related information to record or reproduce data with respect to the information storage medium, wherein:
the disk-related information comprises common disk-related information and changeable parameter information comprising recording speed information, information storage layer information, and write strategy information, and
each of the areas of disk-related information is provided with a corresponding recording speed, information storage layer and write strategy information set, wherein the areas of disk-related information are sequenced according to a specified rule represented by information of the recording speed, information storage layer, and write strategy information sets.

9. An apparatus to reproduce and/or record data from and/or on an information storage medium, comprising:
a pickup unit emitting a light to transfer data with respect to the information storage medium; and
a controller which controls the pickup unit to read changeable parameter information of disk-related information from areas of disk-related information, the areas of disk-related information being ordered according to the changeable parameter information, wherein the changeable parameter information comprises recording speed information, information storage layer information, and write strategy information.

10. An apparatus to reproduce and/or record data from and/or on an information storage medium, comprising:
a pickup unit emitting a light to transfer data with respect to the information storage medium; and
a controller which controls the pickup unit to read disk-related information comprising common disk-related information and changeable parameter information, wherein the changeable parameter information comprises recording speed information, information storage layer information, and write strategy information, and the areas of the disk-related information are sequenced according to a specified rule represented by information of the recording speed, information storage layer, and write strategy information sets.

* * * * *